Jan. 5, 1971   D. A. BERBEL ET AL   3,551,988
AUTOMOTIVE TOOL
Filed July 15, 1968   2 Sheets-Sheet 1

D. A. BERBEL & L. J. KELLER
INVENTOR.
BY C. Ray Holbrook Jr.
Attorney

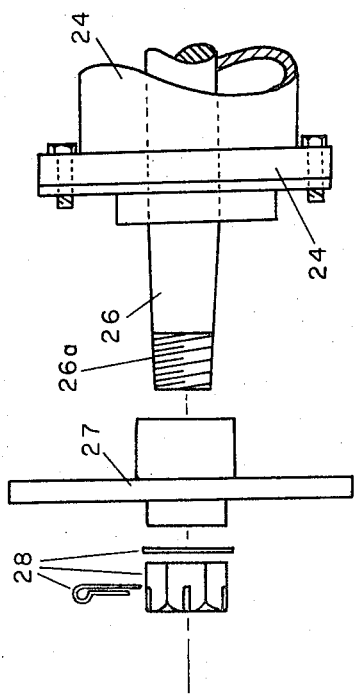
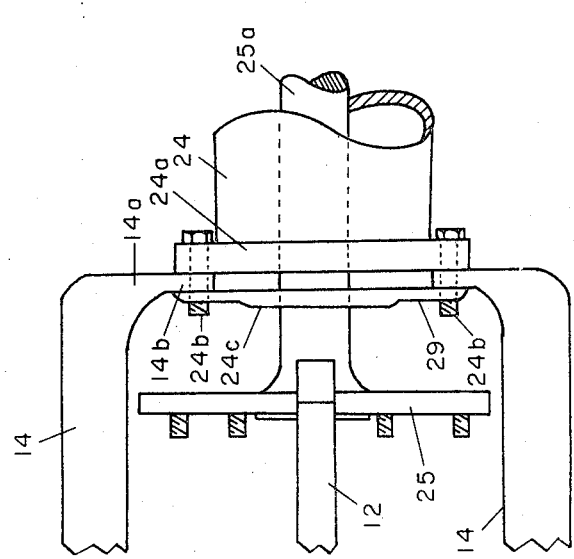

United States Patent Office 3,551,988
Patented Jan. 5, 1971

1

3,551,988
AUTOMOTIVE TOOL
Daniel A. Berbel, 5610 Ave. K, and Leon J. Keller, 615 14th St., both of Galveston, Tex. 77550
Filed July 15, 1968, Ser. No. 744,939
Int. Cl. B23p 19/04
U.S. Cl. 29—259                                6 Claims

ABSTRACT OF THE DISCLOSURE

A tool for withdrawing an axle having a flanged end from an axle housing, the tool comprising an inverted U-shaped pulling bracket, a pushing bracket disposed below said pulling bracket, a screw shaft threaded through the pulling bracket and rotatably connected with the pushing bracket, the pulling bracket having depending legs adapted to receive the peripheral edge of the flanged end of said axle, the pushing bracket being adapted to rest upon and push against the surface of the axle housing, the pulling and pushing bracket being adapted such as to substantially prevent rotation with respect to one another.

BACKGROUND OF THE INVENTION

The present invention relates to an automobile repair tool. More particularly, the present invention relates to a tool for pulling the rear axle of an automobile from the differential supporting housing.

The removal of the rear axle of an automobile from the differential supporting housing is at best a relatively difficult and time consuming job. This is primarily because there is little to firmly grasp or clamp onto for pulling the axle from the housing. Also, it is quite usual for the axle to be frozen to some extent within the differential housing thus, considerably complicating the withdrawing of such axle.

A tool has been proposed for pulling axles wherein two spaced apart brackets each having depending legs are provided. These brackets are connected by means of a threaded shaft which is rotatably connected to the two brackets and in threaded engagement with a nut positioned above the upper bracket. Rotation of this nut on the threaded shaft adjusts spacing of the two brackets. The upper bracket and its depending legs are adapted for pushing against the axle housing while the lower bracket and its depending legs are adapted for attachment to and pulling of the flange adjacent the end of the axle. Such pull-push relationship provides for extraction of the axle from the axle housing. This proposed tool is, however, without means to prevent rotation of the upper and lower brackets with respect to one another and thus, rotation can occur which results in much wasted energy and time. Additionally, this tool would require the use of two wrenches or other means for rotating the nut and screw shaft with the respect to one another. Very important also is that it is difficult for one man alone to position and operate this proposed tool.

It is an object of the present invention to provide a new and improved tool for pulling the rear axles of automobiles.

Another object of the present invention is to provide a new and improved tool for withdrawing the rear axle from the differential housing of an automobile.

Still another object of the present invention is to provide a new and improved tool for pulling the rear axle of an automobile which may be handily operated by a single mechanic and which, once attached, does not slip in use.

A remaining object of the present invention is to provide a new and improved tool for withdrawing the rear axle from the differential housing which does not cause any damage to such housing.

Additional objects will become apparent from the following description of the invention herein disclosed.

SUMMARY OF THE INVENTION

The present invention which fulfills these and other objects, is a tool for withdrawing from an axle housing an axle which extends beyond said axle housing and which has a circular flange adjacent the end thereof extending beyond said axle housing, said tool comprising an inverted substantially U-shaped pulling bracket including a base bar having spaced apart substantially parallel depending pulling legs slidably connected thereto adjacent the opposite ends thereof, the lower ends of said pulling legs being adapted to receive the peripheral edge of said circular flange of said axle, a screw shaft threaded through said base bar near the midpoint of said base bar such that rotation of said screw shaft results in travel of said base bar along the length of said screw shaft, an inverted substantially U-shaped pushing bracket disposed below said pulling bracket and including a base bracket comprising crossed bars including means for rotatably receiving said screw shaft therein for forcing said crossed bars away from said pulling bracket, one of said bars being aligned with an substantially parallel and below said base bar of said pulling bracket and being slotted adjacent the ends thereof to permit extension therethrough of said depending pulling legs, the other of said crossed bars having two substantially parallel depending pushing legs slidably connected to said bar adjacent opposite ends thereof, the lower ends of said depending pushing legs being adapted for resting on the surface of said axle housing.

In particularly useful embodiments of the present invention, the lower ends of said depending pushing legs are adapted for non-slidable contact with said axle housing. Also with such useful embodiments, there is provided an adjustable tie bolt extending through each of said depending pushing legs for spacing and retaining said pushing legs in fixed position with respect to said axle housing.

The tool of the present invention provides for the withdrawal of even the most difficult axles from axle housings. Such tool may be readily positioned and used by a single mechanic. Once attached, the tool described and claimed herein does not slip or rotate with respect to the axle housing. Additionally, because of the clean design and simplicity of operation, the present tool does not cause damage to the axle or axle housing.

DESCRIPTION OF THE DRAWINGS

FIG. 4 of the drawings is a side elevational view illustrating attachment of the tool of the present invention to a conventional axle housed in a conventional axle housing.

FIG. 5 of the drawings is a side elevational view of an axle and axle housing of the type which does not include a flange adjacent the end of said axle and particularly illustrating an adapting means for use with said axle whereby the tool of the present invention may be utilized to pull such axle.

DESCRIPTION OF THE PREFERRED EMBODIMENTS OF THE PRESENT INVENTION

Figure 1:
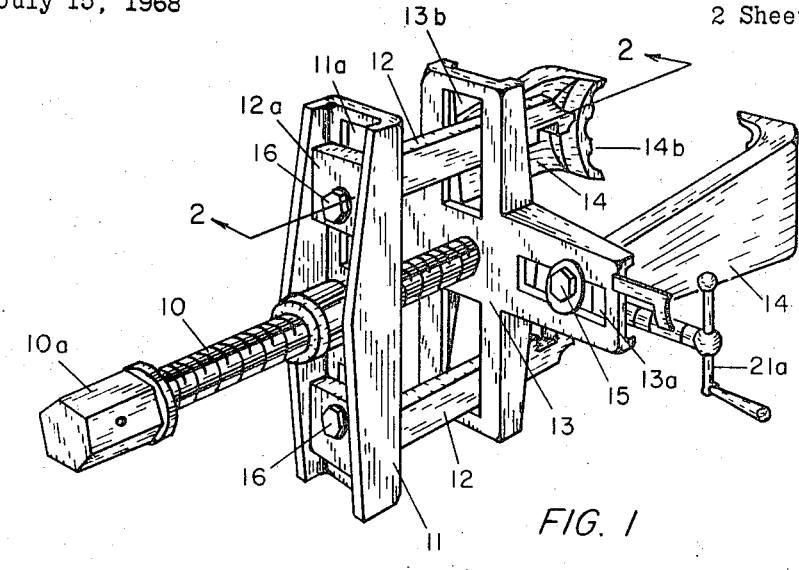
FIG. 1 of the drawings is a perspective view of the tool of the present invention.

To describe the preferred embodiments of the present invention, reference is made to the accompanying drawings. In the drawings, the same reference characters are used throughout to denote like features of the tool of the present invention.

Referring to the drawings, the tool of the present invention includes a substantially inverted U-shaped pulling bracket through which is threaded a screw shaft 10. The pulling bracket comprises a base bar 11 and two spaced apart, substantially parallel depending pulling legs 12. Disposed below the pulling bracket is a pushing bracket comprised of a crossed bar section 13 and two spaced apart, substantially parallel pushing legs 14.

Pushing legs 14 are slidably connected to crossed bar section 13 adjacent opposite ends thereof by means of retaining balls 15 which screw into a portion or segment of pushing legs 14 extending upward through slots 13a of crossed bar section 13. By loosening retaining bolts 15, pushing, legs 14 may be readily moved along the length of slots 13a.

Additionally, by sufficient loosening of retaining bolts 15, pushing legs 14 may be rotated slightly about a horizontal axis transverse to slot 13a. Conversely, the tightening of retaining bolts 15 will securely fix pushing legs 14 in place. The head of the retaining bolt generally is of greater diameter or width than the width of slots 13a.

To facilitate adapting pushing legs 14 for non-slidable contact with the axle housing, a turned in portion 14a is provided at the lower end of said pushing legs 14. Such turned in portion 14a is contoured on the bottom side thereof to provide for maximum surface contact between such portion 14a and the axle housing surface upon which it will rest in use of the tool of the present invention. In a particularly useful embodiment of the present invention, the extremities of turned in portion 14a of legs 14 are provided with a generally serrated edge 14b with the serrations patterned to interlock with the bolts holding the bearing plate to the axle housing. Such interlocking makes substantially impossible rotation of the pushing bracket of the tool of the present invention during its operation.

Pulling legs 12 are slidably connected to base bar 11 adjacent opposite ends of base bar 11 by means of bolt 16 and nut 17. Preferably, the upper end of pulling legs 12 extend upward through slots 11a adjacent the ends of base bar 11 with the upper segment 12a of this extension being flattened to provide a diameter or width greater than the width of slots 11a.

Figure 2:
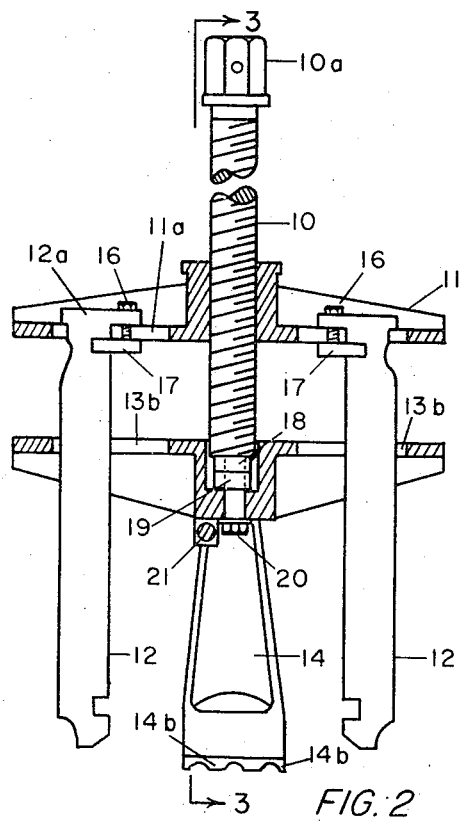
FIG. 2 of the drawings is a cross-sectional view of the tool of the present invention as viewed along line 2—2 of FIG. 1.
Figure 3:
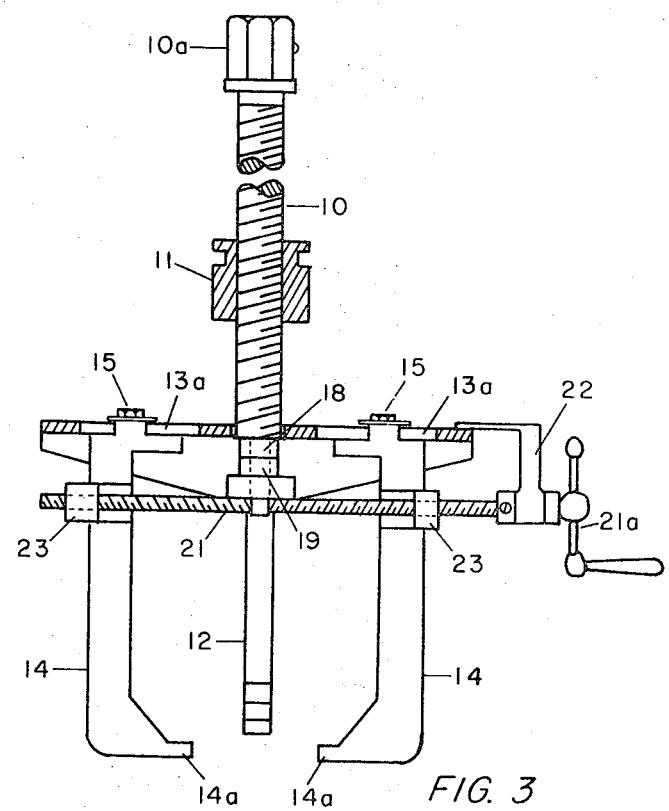
FIG. 3 of the drawings is a cross-sectional view along line 3—3 of FIG. 2.

Such arrangement allows base bar 11 to push against such upper segment 12a to provide the pulling function of pulling legs 12. In this preferred arrangement, which is illustrated in FIGS. 1 and 2, bolt 16 passes downwardly through the flattened upper segment 12a of pulling legs 12 to join with nut 17 which is located below base bar 11. Nut 17 also possesses a diameter or width greater than the width of slot 11a. As with the operation of pushing legs 14, the loosening of bolt 16 and nut 17 will allow slidable movement of pulling legs 12 along the length of slot 11a and if loosened sufficiently, will allow for some rotational motion of pulling legs 12 to facilitate connection thereof to the flange of the axle to be pulled.

To prevent rotational motion of base bar 11 with respect to crossed bar 13, pulling legs 12 extend downwardly through slots 13b of crossed bar 13 which are located adjacent opposite end of the bar segment of crossed bar 13 which crosses the other bar segment to which pushing legs 14 are connected. Slots 13b generally are of dimensions substantially similar to those of slots 11a of base bar 11.

Screw shaft 10 is threaded through base bar 11 such that rotation of screw shaft 10 provides for travel of base bar 11 along the length of screw shaft 10. The base of screw shaft 10 is rotatably connected to crossed bar 13 by means of a spacer 18 which spaces the vertical surface of screw shaft 10 from the body of crossed bar 13, ball bearings 19 below the base of screw shaft 10 and between said base and the upper surface of crossed bar 13, and a shaft bolt screw 20 which extends upward through crossed bar 13 and threadedly engages the base of screw shaft 10. While it is not essential, it is somewhat preferred that a cylindrical indention in the upper surface of crossed bar 13 be provided to receive the lower end and base of screw shaft 10 and ball bearings 19 upon which screw shaft 10 rotates with respect to crossed bar 13.

In operation, a wrench or other such tool is used to rotate screw shaft 10. To facilitate the use of a wrench for such rotation, a hexagonal or octagonal shaped head 10a is often provided at the upper end of screw shaft 10. Rotation of screw shaft 10 will cause base bar 11 of the pulling bracket to travel either forward or away from the pushing bracket, depending upon the direction of rotation. In use in the actual pulling of axles, screw shaft 10 is rotated in such direction as to cause base bar 11 to travel away from the pushing bracket thereby providing for pulling legs 12 to pull the axle flange in one direction while pushing legs 14 push the axle housing in the opposite direction.

To facilitate the positioning of pushing legs 14 and to hold such legs in position, a left and right screw threaded tie bolt 21 is provided. From approximately its midpoint, this tie bolt 21 is threaded right-handed on one end and left-handed on the other, each of the ends being threaded through a threaded segment 23 of each of legs 14. A bracket 22 is provided adjacent one end of tie bolt 21 and is connected to crossed bar 13 to provide support for the cranking end of tie bolt 21. The cranking end of tie bolt 21 has attached thereto a crank or handle 21a by means of which the operator may readily rotate tie bolt 21. Because of the opposite threading of each end of tie bolt 21, rotation thereof results in the travel of threaded segments 23 and thus legs 14, in opposite direction from one another. In other words, rotation of tie bolt 21 will cause legs 14 to move toward one another or away from one another depending upon the direction of rotation of tie bolt 21.

Referring particularly to FIG. 4, the lower ends of pushing legs 14 and pulling legs 12 are shown in operative connection with a conventional rear axle assembly. Pulling legs 12 are connected with axle flange 25 which extends from axle housing 24. Pushing legs 14 are positioned upon the surface of housing flange 24a and against flange bolts 24b which retain bearing plate 24c of axle housing 24 in position therewith. As is apparent from FIG. 4, pushing legs 14 are firmly positioned and will not slip or rotate as pulling legs 12 and axle flange 25 along with axle shaft 25a are drawn away from axle housing 24 by rotation of screw shaft 10.

FIG. 5 illustrates a means for adapting an axle 26 of the type not having an axle flange on an end thereof for pulling by use of the tool of the present invention. Such axles as this generally are provided with a threaded segment 26a adjacent the end of axle 26. The adapting means comprises a flange adapter 27 which fits over axle 26 and which is prevented from slipping off of axle 26 by means of a retaining assembly 28. Retaining assembly 28 generally comprises three members, a nut which threads onto threaded segment 26a, a washer fitting between the nut and flange adapter 27, and a pin which will pass through a hole through and adjacent to the end of said threaded segment 26a. Of course, as is readily apparent, flange adapter 27 may be threaded itself for threading onto threaded segment 26a and thus may, if desired, be used without retaining assembly 28. Additionally, with retaining assembly 28, the pin and/or washer may if desired, be dispensed with. After flange adapter 27 has been secured to axle 26, then the tool of the present invention is operated in respect thereto in substantially the same manner as described above with respect to conventional axle assemblies wherein the axles have a flanged end thereof.

What is claimed is:

1. A tool for withdrawing from an axle housing an axle which extends beyond said axle housing and which has a circular flange adjacent the end thereof extending beyond said axle housing, said tool comprising an inverted substantially U-shaped pulling bracket including a base bar having spaced apart substantially parallel depending pulling legs slidably connected thereto adjacent the opposite ends thereof, the lower ends of said pulling legs being adapted to receive the peripheral edge of said circular flange of said axle, a screw shaft threaded through said base bar near the midpoint of said base bar such that rotation of said screw shaft results in travel of said base bar along the length of said screw shaft, an inverted substantially U-shaped pushing bracket disposed below said pulling bracket and including a base bracket comprising crossed bars including means for rotatably receiving said screw shaft therein for forcing said crossed bars away from said pulling bracket, one of said bars being aligned with and substantially parallel and below said base bar of said pulling bracket and being slotted adjacent the ends thereof to permit extension therethrough of said depending pulling legs, the other of said crossed bars having two substantially parallel depending pushing legs slidably connected to said bar adjacent opposite ends thereof, the lower ends of said depending pushing legs being adapted for resting on the surface of said axle housing.

2. The tool of claim 1 wherein the lower ends of said depending pushing legs are adapted for non-slidable contact with said axle housing.

3. The tool of claim 2 wherein the lower extremities of said depending pushing legs are provided with a generally serrated edge for interlocking with bolts holding the bearing plate of said axle housing in connection therewith.

4. The tool of claim 1 wherein there is provided an adjustable right and left screw threaded tie bolt extending through each of said depending pushing legs for spacing and retaining said pushing legs in fixed position with respect to said axle housing.

5. The tool of claim 1 wherein said means for rotatably receiving said screw shaft within said crossed bars comprises ball bearings between the base of said screw shaft and an upper surface of said crossed bars and a shaft bolt extended through said crossed bar and in threaded engagement with the lower end of said screw shaft.

6. The tool of claim 1 wherein the upper end of said screw shaft is provided with a shaped head comprised of joined together flat surfaces.

References Cited
UNITED STATES PATENTS

| | | | |
|---|---|---|---|
| 1,601,752 | 10/1926 | Wortham | 29—246 |
| 2,677,174 | 5/1954 | Lee | 29—259 |
| 2,779,089 | 1/1957 | Allen | 29—254 |

ANDREW R. JUHASZ, Primary Examiner

G. F. GRAFEL, Assistant Examiner